United States Patent
Ma

(10) Patent No.: US 6,477,128 B1
(45) Date of Patent: Nov. 5, 2002

(54) PORTABLE PLAYER SUITABLE FOR LARGE COMPACT DISKS AND SMALL COMPACT DISKS

(75) Inventor: Hsi Kuang Ma, Taipei (TW)

(73) Assignee: Tsun-Wan Yeh, Hsin-Chu (TW)

( * ) Notice: Subject to any disclaimer, the term of this patent is extended or adjusted under 35 U.S.C. 154(b) by 126 days.

(21) Appl. No.: 09/689,791

(22) Filed: Oct. 13, 2000

(30) Foreign Application Priority Data

Sep. 25, 2000 (TW) ........................................ 89216546 U

(51) Int. Cl.⁷ ............................................... G11B 33/02
(52) U.S. Cl. ........................................................ 369/77.1
(58) Field of Search .............................. 369/77.1, 75.1, 369/78, 289, 291

(56) References Cited

U.S. PATENT DOCUMENTS

| | | | |
|---|---|---|---|
| 1,788,784 A | * 1/1931 | Tulchin ........................ | 369/289 |
| 5,208,802 A | * 5/1993 | Suzuki et al. ................. | 206/310 |
| 5,265,083 A | * 11/1993 | Ishii et al. .................... | 369/75.1 |
| 5,768,239 A | * 6/1998 | Sellers ......................... | 369/75.2 |
| 6,370,099 B1 | * 4/2002 | Crigler ......................... | 361/683 |

\* cited by examiner

*Primary Examiner*—Hoa T. Nguyen
*Assistant Examiner*—Julie Anne Watko
(74) *Attorney, Agent, or Firm*—Troxell Law Office PLLC

(57) ABSTRACT

A portable player suitable for large compact disks and small compact disks comprises a seat having a read heading and a playing device, and an upper cover having a size correspondent to said seat. At least one of the seat and the upper cover has a groove at a lateral side and/or a front side. A protecting piece is installed, respectively. The protecting piece is a round sheet and has a notch correspondent to the shape of the groove for being engaged with said groove so as to protect a large compact disk

5 Claims, 4 Drawing Sheets

PORTABLE PLAYER SUITABLE FOR LARGE COMPACT DISKS AND SMALL COMPACT DISKS

BACKGROUND OF THE INVENTION

1. Field of the Invention

The present invention relates to a portable player suitable for large compact disks and small compact disks.

2. Description of Related Art

The portable player is a popular secret player. Initially, the portable player is suitable for tapes and then CD portable players are developed so that the volume and weight are more and more compact and thus becomes popular to young peoples.

Another, initially, a tape is used as a recording medium. However, since the compact disk is compressible and then the compressible data can be decompressed in the player so that the recording medium becomes more and more compact with a small volume. Therefore, a small compact disk is produced, which has identical operational ways, such as reading and playing, it is identical to the prior art compact disk.

The styles and contents of the small compact disks are not as plentiful as large compact disks, especially, since large compact disks are popular for a long time, they can provide versatile selections to the users. Meanwhile, if the large compact disks are deserted in order to use large compact disks.

The problems for playing a large compact disk through a portable player of small compact disks is that the large compact disk will has a part protruded from the player, and this part can not be protected well. As a result, the safety of the large compact disk is not preferred.

SUMMARY OF THE INVENTION

Accordingly, the primary object of the present invention is to provide a portable player suitable for large compact disks and small compact disks comprising a seat having a read heading and a playing device, and an upper cover having a size correspondent to the seat. At least one of said seat and said upper cover has a groove at a lateral side and/or front side. A protecting piece is installed, respectively. The protecting piece is a round sheet and has a notch correspondent to the shape of the groove for being embedded with said groove so as to protect a large compact disk.

The various objects and advantages of the present invention will be more readily understood from the following detailed description when reading in conjunction with the appended drawing.

BRIEF DESCRIPTION OF THE DRAWINGS

The present invention can be more fully understood by referring to the following description and accompanying drawing, in which.

DETAILED DESCRIPTION OF THE PREFERRED EMBODIMENTS

Figure 1:
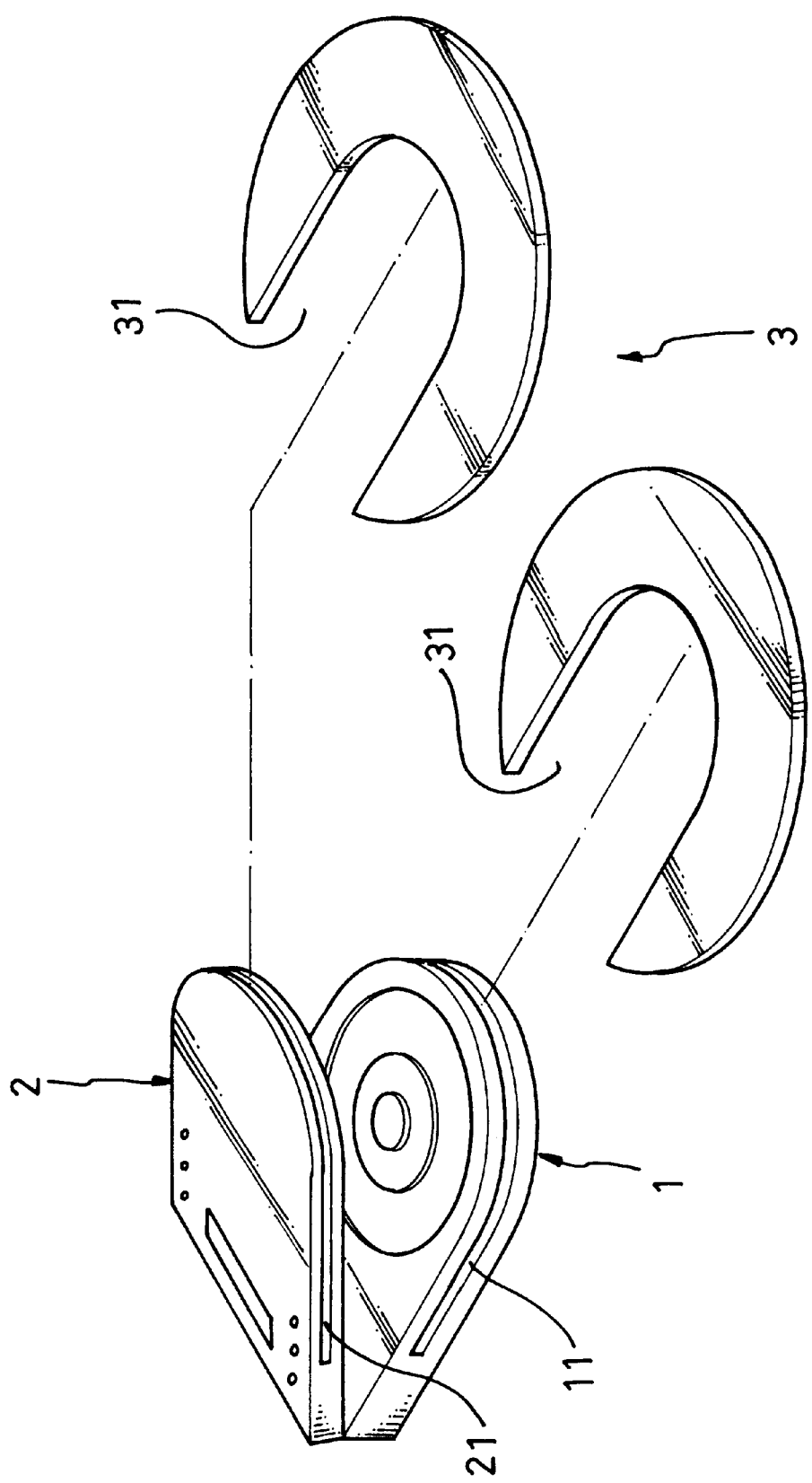
FIG. 1 is an exploded perspective view of the present invention.

With reference to appended figures, the portable player of the present invention is illustrated. The portable player is installed by a seat 2, an upper cover 2 and a set of protecting piece 3.

The seat 1 is a well known in the art. Related components are installed within the seat 1. The top of the seat has posts for embedding a compact disk, a read head and other known devices. Since it is used by a small compact disk, thus the size thereof is slightly larger than the outer diameter of the small compact disk.

The seat 1 of the present invention has a groove 11 at the lateral and front edge thereof. The depth of the groove 11 is suitable for positioning the protecting piece 3.

The upper cover 2 is correspondent to the seat 1 and may cover thereon. The prior art controller and display can be installed thereon. Basically, as the cover is covered, it is tightly sealed on the seat 1.

Different from the prior art, the present invention has a slot 21 at the lateral and front edge thereof for placing the protecting piece 3.

The protecting piece 3 is a sheet, however, the present invention is not confined by this. As the embodiment illustrated in FIGS. 1 and 2, the protecting piece 3 is a sheet, and the width for embedding thereof is not large than the groove 11 of the seat 1 and/or the width of the slot 21 of the upper cover 2 for embedding. A notch 31 is formed on the protecting piece and is respect to the inner shape of the groove 11. The shape and size of the notch 31 is correspondent to the groove 11 and/or slot 21.

Figure 2:
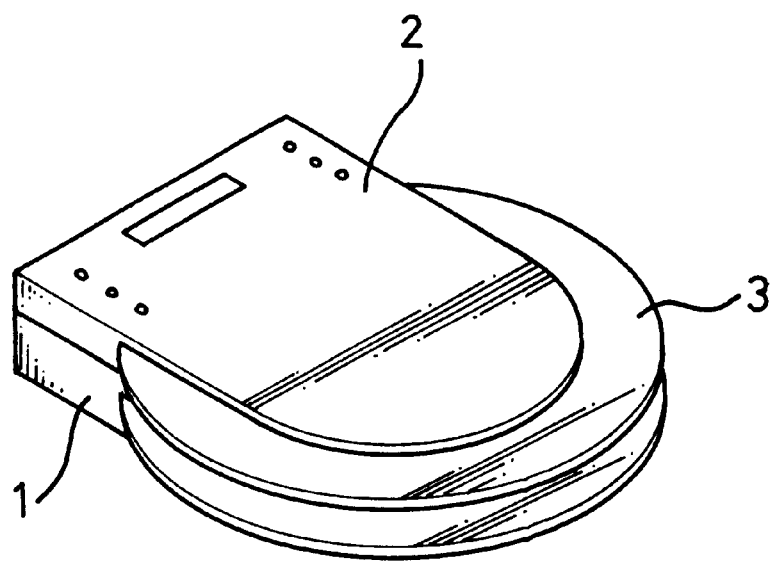
FIG. 2 is a schematic perspective view showing the embodiment of the present invention.

Further referring to the appended figures, when generally a small compact disk is used, the protecting piece 3 is useless. However, as a large compact disk is used, a protecting piece 3 will be embedded into the groove 11 and the slot 21, as shown in FIG. 2. Then, the upper and lower sides of the large compact disk is protected by the protecting piece 3 so as to expose out.

Figure 3:
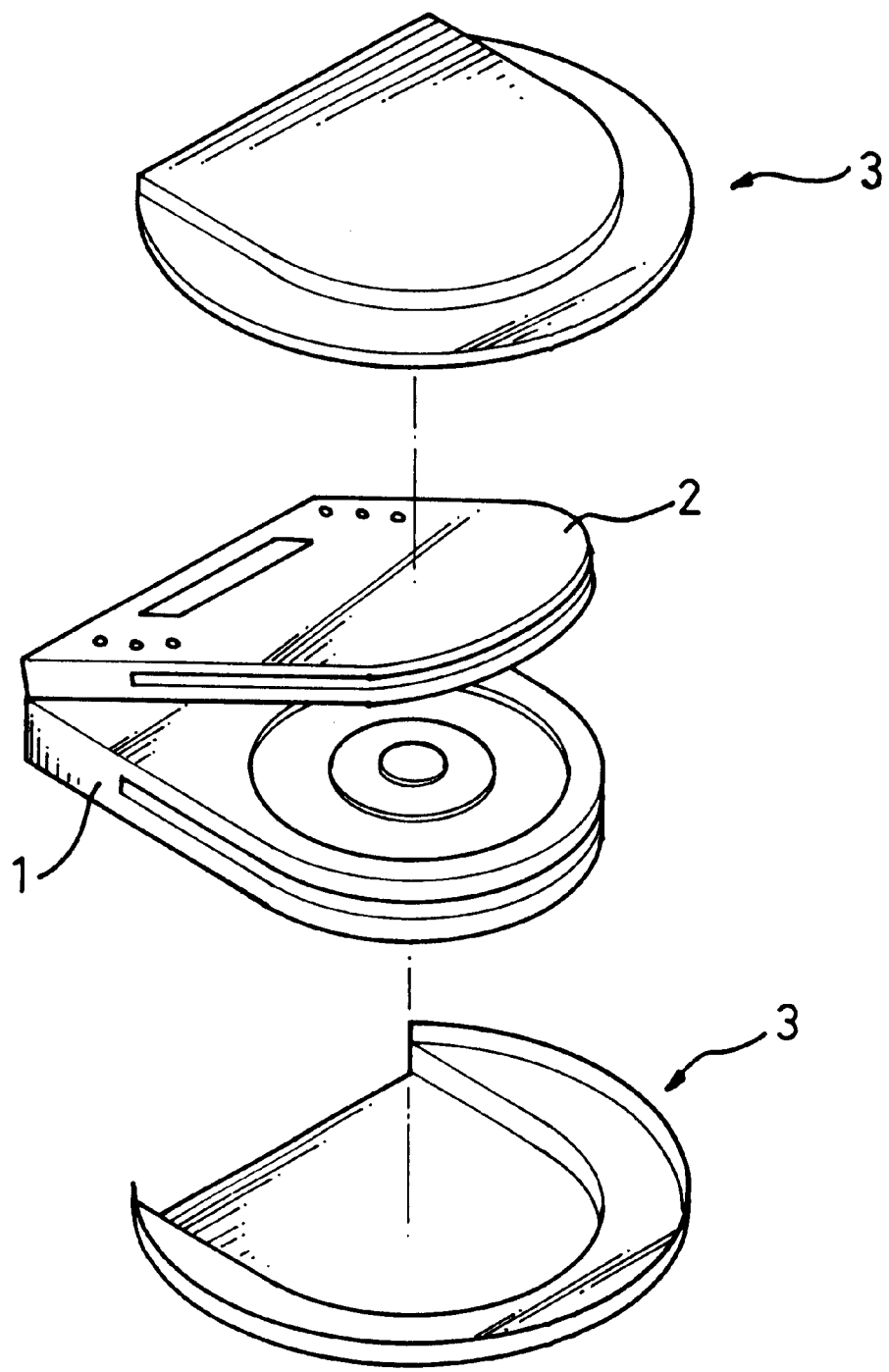
FIG. 3 is an exploded perspective view of another embodiment in the present invention.

Referring to FIG. 3, the rim of the notch 31 of the protecting piece 3 of the present invention may be extended upwards or downwards for being formed with a preferable protection. However, this is a further modification to the aforesaid embodiment, thus the details will not be further described herein.

Figure 4:
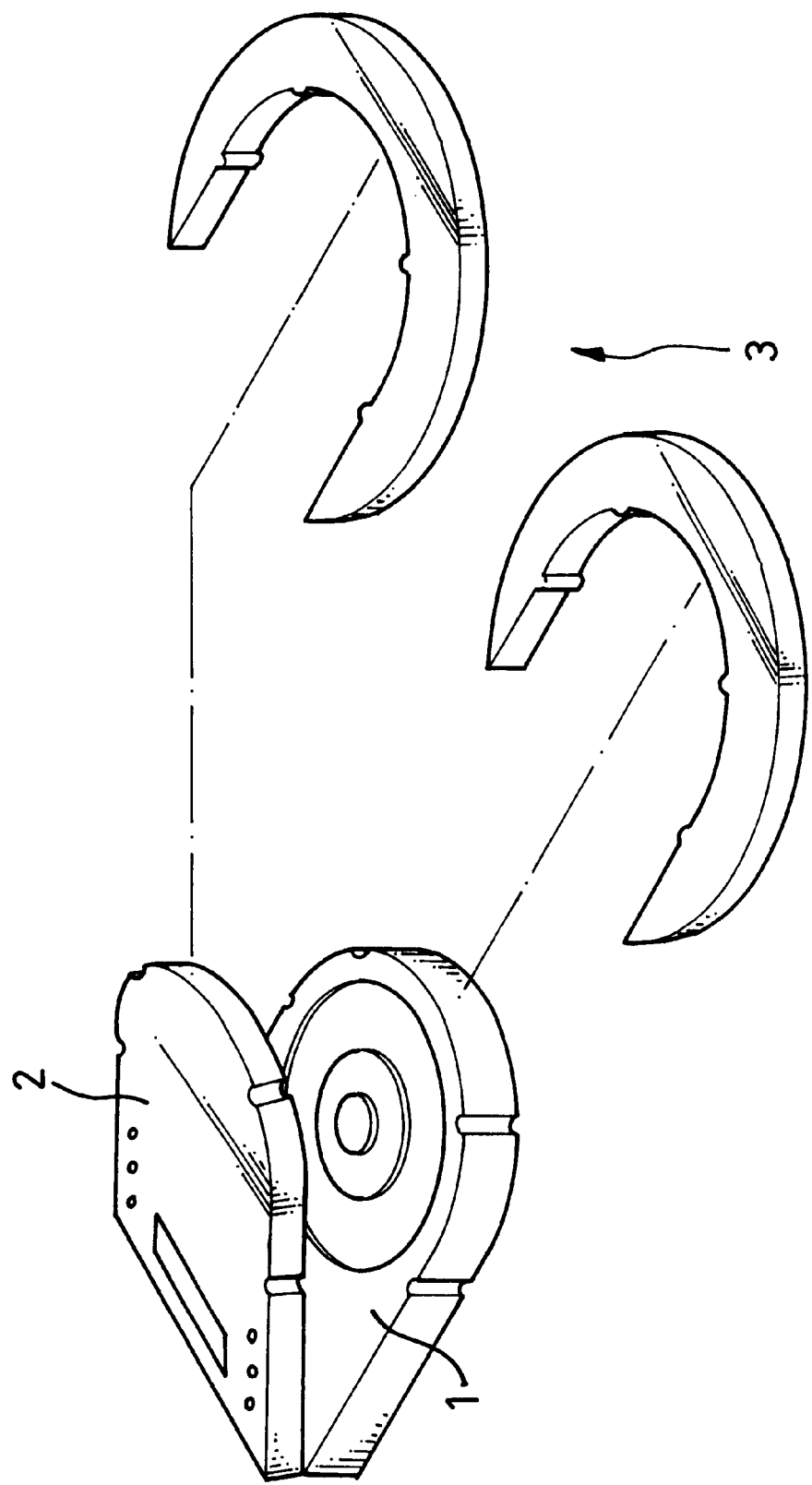
FIG. 4 is an exploded perspective view of a further embodiment of the present invention.

Referring to FIG. 4, in the present invention, the grooves in the upper cover 2 and the seat 1 may be formed by several sections. While the protecting piece 3 may be extended with respective tenons for buckling with the grooves so as to be formed with a protection.

Therefore, by the present invention, a small compact disk can be replaced by a large compact disk due to the installation of the protecting piece 3. Therefore, the large compact disk remains to be used without being left unused due to a new portable player and thus, the resource can be used effectively.

The above described embodiments are not intended to limit the scope of the present invention, as one skilled in the art can, in view of the present invention, expand such embodiments to correspond with the subject matter of the present invention claimed below. Therefore, all such substitutions and modifications are intended to be embraced within the scope of the invention as defined in the appended claims.

What is claimed is:

1. A portable player suitable for large compact disks and small compact disks comprising:

a seat having a reading head and a playing device; and an upper cover having a size correspondent to said seat;

characteristic in that at least one of said seat and said upper cover has a groove at a lateral side and/or front side, and a protecting piece is installed, respectively;

said protecting piece is a round sheet and has a notch correspondence to the shape of said groove for being engaged with said groove so as to protect a large compact disk.

2. The portable player suitable for large compact disks and small compact disks as claimed in claim 1, wherein the player further comprises an additional protecting piece, wherein the groove of said seat has one of the protecting pieces installed therein, and wherein the groove of said upper cover has the other of said protecting pieces installed therein.

3. The portable player suitable for large compact disks and small compact disks as claimed in claim 1, wherein a rim of said notch of said protecting piece is integrally formed with an annular protrusion.

4. The portable player suitable for large compact disks and small compact disks as claimed in claim 1, wherein a size of said protecting piece is not smaller than that of said large compact disk.

5. The portable player suitable for large compact disks and small compact disks as claimed in claim 1, wherein said groove is one of several grooves in said at least one of said seat and said upper cover, and wherein said notch is one of a plurality of tenons of said protecting piece, wherein each of said tenons is embedded in a respective one of said grooves.

* * * * *